US006630547B1

(12) United States Patent
Lynch et al.

(10) Patent No.: US 6,630,547 B1
(45) Date of Patent: Oct. 7, 2003

(54) USE OF SILANES TO CONTROL MOLECULAR WEIGHT IN OLEFIN POLYMERIZATIONS

(75) Inventors: Michael W. Lynch, West Chester, OH (US); Shaotian Wang, Mason, OH (US); William J. Sartain, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/166,934

(22) Filed: Jun. 11, 2002

(51) Int. Cl.$^7$ .................................................. C08F 4/42
(52) U.S. Cl. ....................... 526/128; 526/160; 526/943; 526/161; 502/155; 502/152
(58) Field of Search ................................ 526/128, 160, 526/943, 161; 502/155, 152

(56) References Cited

U.S. PATENT DOCUMENTS

| | | | |
|---|---|---|---|
| 4,752,597 A | 6/1988 | Turner | 502/104 |
| 4,791,180 A | 12/1988 | Turner | 526/160 |
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,539,124 A | 7/1996 | Etherton et al. | 548/402 |
| 5,554,775 A | 9/1996 | Krishnamurti et al. | 556/7 |
| 5,578,690 A | 11/1996 | Marks et al. | 526/347 |
| 5,637,660 A | 6/1997 | Nagy et al. | 526/160 |
| 5,648,440 A | 7/1997 | Sugano et al. | 526/132 |
| 5,902,866 A | 5/1999 | Nagy et al. | 526/133 |
| 6,075,103 A | 6/2000 | Marks et al. | 526/127 |
| 6,077,919 A * | 6/2000 | Marks et al. | 526/82 |
| 6,211,311 B1 * | 4/2001 | Wang et al. | 526/131 |
| 6,232,260 B1 * | 5/2001 | Nagy et al. | 502/155 |

FOREIGN PATENT DOCUMENTS

| | | | |
|---|---|---|---|
| EP | 0 665 243 | * | 8/1995 |
| EP | 0739910 A2 | | 10/1996 |
| WO | WO 99/24446 | | 5/1999 |

OTHER PUBLICATIONS

Koo et al., *J. Am. Chem. Soc.* 121 (1999) 8791.
N. Buu–Hoi et al., *J. Chem. Soc.* (1952) 2225.
Y. V. Kissin, *J. Polym. Sci. Part A: Polym. Chem.*, 33 (1995) 227.
M. Harkonen,, J. V. Seppala, T. Vaananen, *Makromol. Chem.* 192 (1991) 721.

* cited by examiner

*Primary Examiner*—Ling-Siu Choi
(74) *Attorney, Agent, or Firm*—John Tyrell; Jonathan L. Schuchardt

(57) ABSTRACT

A process for polymerizing an olefin is disclosed. The olefin is polymerized with a catalyst precursor in the presence of an activator and an organosilane modifier. Use of the organosilane increases polyolefin molecular weight. The process is easy to practice and affords polyolefins with conventional polymerization methods such as slurry polymerizations or gas-phase polymerizations.

18 Claims, No Drawings

USE OF SILANES TO CONTROL MOLECULAR WEIGHT IN OLEFIN POLYMERIZATIONS

FIELD OF THE INVENTION

This invention relates to a process for making polyolefins. In particular, the invention relates to a polymerization process with a catalyst precursor, an activator, and an organosilane modifier. The modifier increases polyolefin molecular weight without significantly reducing catalyst activity.

BACKGROUND OF THE INVENTION

Organosilane modifiers have been studied with Ziegler-Natta catalysts. Y. V. Kissin, *J. Polym. Sci. Part A: Polym. Chem.*, 33 (1995) 227, reports a series of ethylene-hexene copolymerization experiments with varying amounts of diphenyldimethoxysilane. The silane increases the $M_w$ and decreases the catalyst activity. M. Harkonen, J. V. Seppala and T. Vaananen, *Makromol. Chem.* 192 (1991) 721, studied Ziegler-Natta catalyzed propylene polymerizations with fourteen alkoxysilanes. In each case, the activity of the catalyst decreased (18–66%) versus the control experiment without organosilane. In all but two instances, the viscosity-average molar mass increased.

Interest in single-site (metallocene and non-metallocene) catalysts continues to grow rapidly in the polyolefin industry. These catalysts are more reactive than Ziegler-Natta catalysts and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Traditional metallocenes commonly include one or more cyclopentadienyl groups or cyclopentadienyl-like groups such as indenyl, fluorenyl, and substituted varieties of these, but many other ligands have been used. Thus, a catalyst structure can be fine-tuned to give polymers with desirable properties. Other known polymerization-stable ligands are heteroatomic ligands such as boraaryl, pyrrolyl, indolyl, indenoindolyl, quinolinoxy, pyridinoxy, and azaborolinyl as described in U.S. Pat. Nos. 5,554,775, 5,539,124, 5,637,660, 5,902,866 and 6,232,260.

The incorporation of hydrosilanes in polymerizations using cyclopentadienyl metallocene catalysts is described in EP 0739910 A2, *J. Am. Chem. Soc.* 121 (1999) 8791, and in U.S. Pat. Nos. 5,578,690, 6,075,103 and 6,077,919. High levels of hydrosilane are used to lower the polymer molecular weight. For instance, in EP 0739910A2, 0.8 to 10.6 mmoles of silane are used per 0.029 mmoles cyclopentadienyl metallocene catalyst. At these levels, the polymer molecular weight decreases with increasing hydrosilane.

One attribute of many metallocene and single-site catalysts is their propensity to produce lower molecular weight polymers. Thus for certain commercial applications, increased molecular weight is desirable. For instance, polymer toughness and strength generally increase with increased molecular weight. Despite the importance of olefin polymerizations and the considerable research that has been done on various catalyst systems, there remains a need to modify the catalyst to be able to increase the molecular weight of the resultant polyolefin. Surprisingly, we have found that low levels of organosilanes can be used to increase polyolefin molecular weight without significantly reducing catalyst activity.

SUMMARY OF THE INVENTION

This invention is a process for the polymerization of an olefin. An olefin is polymerized with a catalyst precursor in the presence of an activator and an organosilane modifier. The organosilane allows the catalyst to maintain high activity while increasing polyolefin molecular weight. The process is robust, easy to practice and affords polyolefins with improved properties.

DETAILED DESCRIPTION OF THE INVENTION

The invention is a process for polymerizing olefins. Suitable olefins are $C_2$–$C_{20}$ α-olefins, such as ethylene, propylene, 1-butene, 1-hexene, 1-octene and mixtures thereof. Preferred olefins are ethylene, propylene and mixtures thereof with α-olefins such as 1-butene, 1-hexene, 4-methyl-1-pentene, and 1-octene.

The polymerization is performed with a catalyst precursor comprising a Group 3 to 10 transition or lanthanide metal, M, and at least one polymerization-stable, anionic ligand. Examples of suitable anionic ligands include substituted and unsubstituted cyclopentadienyl, fluorenyl, and indenyl, or the like, such as those described in U.S. Pat. Nos. 4,791,180 and 4,752,597, the teachings of which are incorporated herein by reference. A preferred group of polymerization-stable ligands are heteroatomic ligands such as boraaryl, pyrrolyl, indolyl, indenoindolyl, quinolinoxy, pyridinoxy, and azaborolinyl as described in U.S. Pat. Nos. 5,554,775, 5,539,124, 5,637,660, 5,902,866 and 6,232,260, the teachings of which are incorporated herein by reference. Complexes that incorporate indenoindolyl ligands are particularly preferred (see U.S. Pat. No. 6,232,260 and PCT Int. Appl. WO 99/24446).

The catalyst precursor also usually includes one or more labile ligands such as halides, alkyls, alkaryls, aryls, dialkylaminos, or the like. Particularly preferred are halides, alkyls, and alkaryls (e.g., chloride, methyl, benzyl).

The polymerization-stable ligands can be bridged. Groups that can be used to bridge the ligands include, for example, substituted or unsubstituted methylene, ethylene, 1,2-phenylene, and dialkyl silyls. Normally, only a single bridge is included. Bridging changes the geometry around the transition or lanthanide metal and can improve catalyst activity and other properties such as comonomer incorporation.

Exemplary catalyst precursors are bis(cyclopentadienyl) zirconium dimethyl, bis(cyclopentadienyl)zirconium dichloride, bis(indenyl)titanium dibenzyl, cyclopentadienyl (indenoindolyl)zirconium dichloride, bis(fluorenyl) zirconium dimethyl, 8-quinolinoxy(cyclopentadienyl)titanium dimethyl, bis(2-pyridinoxy)titanium diethyl, (1-dimethylaminoborabenzene)cyclopentadienyl-zirconium dichloride, bis(1-methylborabenzene)zirconium dimethyl, bis(indolyl)zirconium dimethyl, and the like.

Preferred transition metals are Group 4–6 transition metals and of these zirconium is especially preferred.

The process is performed in the presence of an activator. Suitable activators ionize the catalyst precursor to produce an active olefin polymerization catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain nonnucleophilic anions. These compounds generally consist of bulky ligands attached to boron or aluminum. Examples include lithium tetrakis(pentafluorophenyl)borate, lithium tetrakis(pentafluorophenyl)-aluminate, anilinium tetrakis (pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(penta-fluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference.

Suitable activators also include aluminoboronates—reaction products of alkyl aluminum compounds and organoboronic acids—as described in U.S. Pat. Nos. 5,414,180 and 5,648,440, the teachings of which are incorporated herein by reference.

The amount of activator needed relative to the amount of catalyst precursor depends on many factors, including the nature of the catalyst precursor and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 0.1 to about 500 moles, of aluminum per mole of M. When the activator is an organoborane or an ionic borate or aluminate, the amount used will be within the range of about 0.01 to about 5000 moles, preferably from about 0.1 to about 500 moles, of activator per mole of M.

The activator is normally added to the reaction mixture at the start of the polymerization. However, when a supported catalyst system is used, the activator can be deposited onto the support along with the catalyst precursor.

The catalyst precursor and activator are optionally used with an inorganic solid or organic polymer support. Suitable inorganic supports include silica, alumina, silica-aluminas, magnesia, titania, clays, zeolites, or the like. The inorganic support is preferably treated thermally, chemically, or both prior to use to reduce the concentration of surface hydroxyl groups. Thermal treatment consists of heating (or "calcining") the support in a dry atmosphere at elevated temperature, preferably greater than about 100° C., and more preferably from about 150° C. to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference. Suitable organic polymer supports include polyethylene, polypropylene and polystyrene. Small particle size density polyethylene has been found to be particularly suitable. The catalyst precursor and activator can be deposited on the support in any desired manner. For instance, the components can be dissolved in a solvent, combined with a support, and stripped. Alternatively, an incipient-wetness technique can be used. Moreover, the support can simply be introduced into the reactor separately from the precursor and activator.

The loading of catalyst precursor on the support varies depending upon a number of factors, including the identities of the precursor and the support, the type of olefin polymerization process used, the reaction conditions, and other concerns. Usually, the amount of precursor used is within the range of about 0.01 to about 10 wt. % of transition metal based on the amount of supported precursor. A more preferred range is from about 0.1 to about 4 wt. %.

The modifier is an organosilane. By "organosilane," we do not include hydrosilanes. Preferred organosilane modifiers are alkyl alkoxysilanes which have the formula $R_ySi(OR)_{4-y}$ where each R is independently $C_1$ to $C_{30}$ hydrocarbyl and y is an integer from 0 to 3. More preferably, the organosilane modifiers are dialkyl dialkoxysilanes. Exemplary dialkyl dialkoxysilanes are diisopropyldimethoxysilane, isobutylisopropyldimethoxysilane, di-s-butyidimethoxysilane, cyclohexylmethyldimethoxysilane, dimethyldimethoxysilane, dimethyldiethoxysilane, dicyclopentyldimethoxysilane, and mixtures thereof.

Surprisingly, very low levels of modifier are effective. Preferably, the modifier is added at a level of from 0.1 to 10 moles per mole of catalyst precursor, more preferably from 0.2 to 2 moles per mole of catalyst precursor. Lower levels are often ineffective. Excessively higher levels do not result in further increases in molecular weight and may be detrimental to catalyst activity.

Preferably, the modifier is added to the reactor at around the same to time as the addition of the catalyst precursor. The addition can be prior to or subsequent to the addition of the catalyst precursor to the reactor. Optionally, the modifier is premixed with the catalyst precursor and they are fed together to the reactor. The modifier can be added neat or as a solution. When the modifier is added as a solution, suitable solvents include alkanes such as hexane or isobutane. Optionally, the solvent is an olefin used for the polymerization.

The modifiers can be used in a variety of well-known olefin-polymerization processes, including gas, high pressure liquid, slurry, solution, or suspension-phase techniques and combinations of these. The pressures used typically range from about 15 psig to about 30,000 psig. Polymerization temperatures range from about −100° C. to about 300° C., more preferably from about 20° C. to about 200° C., and most preferably from about 60° C. to about 150° C.

The following examples merely illustrate the invention. Those skilled in the art will recognize many variations that are within the spirit of the invention and scope of the claims.

EXAMPLE A

Indenoindolyl Complex Preparation 5,8-Dimethyl-5,10-dihydroindeno[1,2-b] indolylzirconium dichloride (1) was prepared in four steps as follows. First, 8-methyl-5,10-dihydro-indeno[1,2-b] indole was prepared by reacting equimolar amounts of 1-indanone and p-tolylhydrazine hydrochloride in ethanol according to the method of Buu-Hoi (*J. Chem. Soc.* (1952) 2225). In step 2, the indole was N-methylated by first vigorously stirring it with concentrated aqueous sodium hydroxide, toluene, and a phase-transfer catalyst (octadecyltrimethyl-ammonium bromide), then adding a 60% molar excess of chilled methyl iodide, refluxing for 3 h, and performing a typical workup. In step 3, a toluene solution of the dimethylindole compound was deprotonated with n-butyllithium (50% molar excess), and the resulting precipitate, an indenoindolyl anion, was washed with toluene and heptane. Finally, in step 4, the anion reacted with an equivalent of cyclopentadienylzirconium trichloride in toluene/ether solution at room temperature to produce the desired complex, 1, which has NMR spectra consistent with the structure:

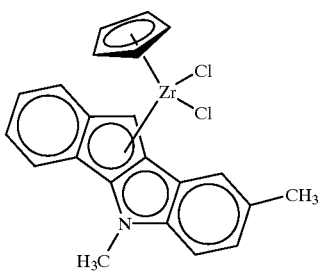

EXAMPLE 1

Preparation of Supported Catalyst

A supported catalyst was prepared by charging 1.9 kg of silica gel (Davison 948) that had been calcined for 4 hours at 250° C. to a stirred reactor and placing the reaction under a nitrogen sweep. Over a period of 30 minutes, 0.62 kg of a polymethylalumoxane solution in toluene (13% aluminum by weight) was added in portions. This mixture was stirred for 1 hour and then a premixture of 34.1 g of indenoindolyl complex 1 and 1.9 kg of a polymethylalumoxane solution in toluene (13% aluminum by weight) was added in portions over a period of about 90 minutes. This reaction mixture was then stirred for 30 minutes.

EXAMPLE 2

Slurry Copolymerization With Modifier

To a 1-L stainless steel autoclave reactor, 100 mL of 1-hexene was added, followed by 1.0 mL of a 0.2 M solution of triisobutylaluminum in heptane, 1.0 mL of heptane containing 4 mg of ARMOSTAT 710 (an antistatic agent sold by Akzo-Nobel), 1.0 mL of a 0.01 M solution of dimethyldimethoxysilane in heptane, and 500 mL of isobutane. Ethylene was added to the reactor to a pressure of 320 psig and reactor was heated to 80° C. Then 0.070 g of the supported catalyst from Example 1 and 100 mL of isobutane was added. The pressure was maintained at 320 psig by addition of ethylene and temperature was maintained at 80° C. Polymerization continued for 30 minutes, after which the reactor was vented and the polymer removed. From the weight of the polymer, the activity was calculated to be 1,200 g polymer per gram supported catalyst per hour. The weight average ($M_w$) molecular weight of the polymer was measured by gel permeation chromatography (GPC) using 1,3,5-trichlorobenzene at 145° C. to be 127,600. Polymer density was determined by ASTM D-1505 to be 0.918 g/mL. The melt index (MI) was measured according to ASTM D-1238, Condition E to be 0.88 dg/min.

COMPARATIVE EXAMPLE 3

Copolymerization Without Modifier

This comparative example shows that without the organosilane modifier, the copolymer obtained had similar properties but lower molecular weight.

The copolymerization process of Example 2 was generally followed except that no dimethyldimethoxysilane was used. Activity: 1,300 g polymer per gram supported catalyst per hour; $M_w$=96,700; density=0.917 g/mL; MI=1.0 dg/min.

EXAMPLE 4

Gas-Phase Copolymerization With Modifier

The reactor used was a 3.3-L vessel with a helical agitator, thermocouple, and a valve for removing the resultant polymer. The jacket contained water, which was recirculated for temperature control at 80° C. Then 0.180 g of the supported catalyst from Example 1 was added to the reactor. Next, 2.5 mL of a 0.01 M solution of dimethyldimethoxysilane in heptane was added to the reactor. The agitator was started and 104 psig of nitrogen was added to the reactor. Thereafter 32 mL of 1-hexene and ethylene sufficient to result in a total pressure of 300 psig reactor pressure was added. A mixture of 11.2% by weight 1-hexene in ethylene was fed into the reactor to maintain 300 psig on the reactor. When the total ethylene feed reached about 330 grams, the ethylene feed was stopped and the reactor was vented. About 370 g of polymer was drained out of the reactor and the polymerization was repeated three more times to remove the original seed bed. The fourth batch of polymer that was drained from the reactor was submitted for testing. Activity: 1020 g polymer per gram supported catalyst per hour; density=0.915 g/mL; MI=2.8 dg/min.

COMPARATIVE EXAMPLE 5

Gas-Phase Copolymerization Without Modifier

This comparative example shows that without the organosilane modifier, the copolymer obtained had similar properties but lower molecular weight as indicated by the higher melt index.

The copolymerization process of Example 4 was generally followed except that no dimethyldimethoxysilane was used. Activity: 890 g polymer per gram supported catalyst per hour; density=0.915 g/mL; MI=3.0 dg/min.

EXAMPLE 6

Gas-Phase Copolymerization With Modifier

This example shows that other organosilanes also increase the molecular weight as indicated by the lower melt index.

The copolymerization process of Example 4 was generally followed except that 0.25 mL of a 0.025 M solution of di-s-butyldimethoxysilane in heptane was used instead of the dimethyldimethoxysilane solution. Activity: 600 g polymer per gram supported catalyst per hour; density=0.915 g/mL; MI=2.5 dg/min.

We claim:

1. A process which comprises polymerizing an olefin with a catalyst precursor in the presence of an activator and an organosilane modifier, excluding hydrosilane wherein the catalyst precursor contains at least one polymerization-stable, anionic ligand.

2. A copolymerization process of claim 1.

3. The process of claim 1 wherein the olefin is selected from the group consisting of ethylene, propylene, 1-butene, 1-pentene, 1-hexene, 1-octene, 4-methyl-1-pentene, and mixtures thereof.

4. The process of claim 1 wherein the catalyst precursor is a Group 4 transition metal catalyst precursor containing one or more substituted or unsubstituted cyclopentadienyl, indenyl, or fluorenyl groups.

5. The process of claim 1 wherein the catalyst precursor contains a polymerization-stable, heteroatomic anionic ligand.

6. The process of claim 5 wherein the polymerization-stable, heteroatomic anionic ligand is selected from the group consisting of boraaryl, pyrrolyl, indolyl, indenoindolyl, quinolinoxy, pyridinoxy, and azaborolinyl.

7. The process of claim 1 wherein the activator is selected from the group consisting of alumoxanes, alkylaluminum compounds, organoboranes, ionic borates, ionic aluminates, aluminoboronates and mixtures thereof.

8. The process of claim 1 wherein the organosilane modifier is used at a level of from 0.1 moles to 10 moles per mole of catalyst precursor.

9. The process of claim 8 wherein the organosilane modifier is used at a level of from 0.5 moles to 3 moles per mole of catalyst precursor.

10. The process of claim 1 wherein the organosilane modifier has the general structure:

$(R)_y$—Si—$(OR)_{4-y}$ such that each R is independently selected from the group consisting of $C_1$–$C_{30}$ hydrocarbyl and y is an integer from 0 to 3.

11. The process of claim 10 wherein each R is independently selected from the group consisting of $C_1$–$C_4$ hydrocarbyl.

12. The process of claim 11, wherein the organosilane modifier is dimethoxydimethylsilane.

13. The process of claim 1 wherein the organosilane modifier is a mixture of two or more organosilanes.

14. The process of claim 1 wherein the polymerization is performed at a temperature within the range of about 60° C. to about 150° C.

15. A slurry polymerization process of claim 1.

16. A gas-phase polymerization process of claim 1.

17. A process which comprises polymerizing an olefin with an indenoindolyl catalyst precursor in the presence of an activator and an organosilane modifier.

18. The process of claim 17 wherein the catalyst precursor incorporates a Group 4 transition metal.

* * * * *